Patented June 24, 1947

UNITED STATES PATENT OFFICE 2,422,688

2,422,688
COMPOSITION COMPRISING COLLOIDAL SILVER SALT OF SULFA DRUG

William A. Lott, Maplewood, N. J., assignor to E. R. Squibb & Sons, New York, N. Y., a corporation of New York No Drawing. Application October 16, 1942, Serial No. 462,293

7 Claims. (Cl. 167—51.5)

This invention relates to, and has for its object the provision of (A) silver salts (i. e. N'-silver-derivatives) of p-amino-benzene sulfonamides, (B) medicinal preparations of such salts for treating infections of the mucous membranes, and (C) methods of producing such salts and preparations.

The p-amino-benzene-sulfonamides comprise, of course, sulfanilamide and the various chemotherapeutic derivatives of sulfanilamide in which the hydrogen on the amido and/or amino group have been replaced by other groups. The p-amino-benzene-sulfonamides preferred for the purpose of this invention are the C-(p-amino-benzene-sulfonamido)-substituted (N-hetero)-monocyclic compounds, notably sulfathiazole.

The silver salts of p-amino-benzene-sulfonamides in colloidal form, and notably colloidal silver sulfathiazole, are valuable chemotherapeutic agents, being highly effective in the treatment of infections (especially streptococcal and gonococcal) of the mucous membranes, and in such related infections as bovine mastitis.

These silver salts may be obtained by reacting an alkali (i. e. an alkali metal, alkaline-earth metal, or ammonium) salt of the corresponding p-amino-benzene-sulfonamide with a soluble salt of silver in water, and recovering the precipitate. If not already in colloidal form, the silver salt may be converted into colloidal form by conventional means, e. g. by passing a suspension thereof in a suitable medium through a colloid mill. Preferably, however, the colloidal form is obtained directly, by suitably controlling the reaction conditions and/or forming the salt in the presence of a protective colloid, e. g. gelatin.

In general, the silver salts of this invention are substantially white and light-stable compounds, from which colloidal solutions (or suspensions) can be readily prepared in either aqueous or oily media; and the colloidal silver salts of this invention (especially when formed in the presence of a protective colloid) can be readily repeptized.

Medicinal preparations essentialy comprising colloidal silver salts of p-amino-benzene-sulfonamides are relatively non-toxic and non-irritating to the mucous membranes and related tissues of man and animals, and highly-bactericidal (especially streptococcicidal and gonococcocidal). They are accordingly highly effective for the treatment of such conditions as gonorrhea, bovine mastitis, and of infections of the mucous membranes of the eye, the nasal mucosa and accessory sinuses, and the genito-urinary mucosa, inter alia. For example, bovine mastitis may be effectively treated by directly injecting (i. e., infusing into the milked-out, functionary mammary gland) a colloidal solution of silver sulfathiazole in an aqueous or (preferably) oily medium.

The following examples are illustrative of the invention:

Example 1

15.2 g. sodium sulfathiazole is dissolved in 150 cc. water, and 50 cc. N/1 silver nitrate solution is added; and the resulting precipitate of silver sulfathiazole is centrifuged and washed with water until free of nitrate ion.

An aqueous silver sulfathiazole magma may be obtained by suspending 2.5% of this product in water.

Desirably, a small excess (e. g. 5%) of sodium sulfathiazole is used in the reaction.

Silver sulfapyridine may be obtained in the same manner (i. e., by substituting sodium sulfapyridine for the sodium sulfathiazole). If an excess of sulfapyridine is present, a temporarily-stable colloidal solution is obtained.

Example 2

10 g. sulfanilamide is dissolved in 55.9 cc. N/1 sodium hydroxide solution, and the solution is diluted (with water) to 200 cc. Then 19.9 cc. 10% silver nitrate solution is added dropwise, while stirring; and the resulting precipitate of silver sulfanilamide is centrifuged, washed with water, and dried.

Example 3

10 g. sodium sulfadiazine is dissolved in 100 cc. water, and 41.2 cc. 10% silver nitrate solution is added dropwise. The resulting white precipitate of silver sulfadiazine is centrifuged, washed, and dried in a vacuum dessicator.

Example 4

15.2 g. sodium sulfathiazole is dissolved in 50 cc. water, and 50 cc. N/1 silver nitrate solution is added dropwise. The resulting precipitate of silver sulfathiazole is centrifuged, washed with water, and dried at a low temperature and under a high vacuum. The dessicated product is a powder of colloidal nature having the appearance of kaolin; and it can be readily repeptized with either aqueous or oily suspension media.

Example 5

100 cc. of a solution of sodium sulfathiazole equivalent to 5.1% sulfathiazole is mixed with 100 cc. of a 5% acacia solution, and 22.9 cc. of a 10% silver nitrate solution is added dropwise, with stirring. Silver sulfathiazole is thus obtained in colloidal suspension, and is precipitated therefrom by adding 100 cc. ethanol; and the precipitate is centrifuged and dried. The resulting acacia-protected, colloidal silver sulfathiazole is readily repeptized by admixing with water.

Example 6

100 cc. of a solution of sodium sulfapyridine equivalent to 5% sulfapyridine is mixed with 8.6 cc. of 10% hydrolyzed gelatin, and 22.9 cc. 10% silver nitrate solution is added with agitation. The reaction mixture, comprising silver sulfapyridine in colloidal suspension, is then placed in a dialysis bag and dialyzed for 12 hours; and the precipitate settling out during dialysis, gelatin-protected, colloidal silver sulfapyridine, is centrifuged and dried.

Example 7

20 g. dextrin is made into a paste with 20 cc. water, and the paste is added to 80 cc. boiling water with stirring. To the resulting solution is added 100 cc. of a solution of sodium sulfapyridine equivalent to 5% sulfapyridine, followed by 31 cc. of 10% silver nitrate solution while stirring. The reaction mixture, which has the consistency of heavy cream, is centrifuged; and the solid material, a dextrin-protected, colloidal silver sulfapyridine, is dried.

Example 8

5 g. sodium alginate is dissolved in 100 cc. water, and the solution is added to a solution of 5 g. sodium sulfapyridine in 100 cc. water. 30.7 cc. 10% silver nitrate solution is then added all at once, the resulting precipitate coming down as a leathery, cheese-like mass. The mixture is then shaken for two days; and the solid material, a sodium alginate-protected, colloidal silver sulfapyridine, is centrifuged and dried.

Example 9

10 g. gelatin is dissolved in 125 cc. water by heating on a steam bath, and the solution is autoclaved at 15 lbs. pressure for an hour. Then 100 cc. of a solution of sodium sulfapyridine equivalent to 5% sulfapyridine is added, followed by 31 cc. 10% silver nitrate solution with agitation; and the reaction mixture is shaken and centrifuged, and the resulting precipitate of gelatin-protected, colloidal silver sulfapyridine is dried.

Example 10

A preparation suitable for the treatment of bovine mastitis by direct injection is obtained by suspending 5% of dry colloidal silver sulfathiazole in light mineral oil, dispersion being effected by passing the suspension through a colloid mill or by means of a pebble mill.

Manifestly a large number of silver salts of other p-amino-benzene-sulfonamides (and medicinal preparations thereof) may be prepared by the procedure of the foregoing examples, using an alkali salt of the appropriate p-amino-benzene-sulfonamide, the following being further examples of such p-amino-benzene-sulfonamides:

2-(p-amino-benzene-sulfonamido)-$\Delta^2$-thiazoline
p-benzamido-benzene-sulfonamide
2-(p-amino-benzene-sulfonamido)-quinoline
2-(p-amino-benzene-sulfonamido)-4-methyl-thiazole
2-(p-amino-benzene-sulfonamido)-4-6-dimethyl-pyrimidine
2-(p-amino-benzene-sulfonamido)-4-methyl-pyrimidine
2-(p-amino-benzene-sulfonamido)-pyrazine The invention may be variously otherwise embodied within the scope of the appended claims.

I claim:
1. A composition essentially comprising a colloidal silver salt of a C-(p-amino-benzene-sulfonamido)-substituted (N-hetero)-monocyclic compound and a protective colloid.
2. The method of preparing a colloidal silver salt of a C-(p-amino-benzene-sulfonamido)-substituted (N-hetero)-monocyclic compound which comprises reacting an alkali salt of the corresponding C-(p-amino-benzene-sulfonamido)-substituted (N-hetero)-monocyclic compound with a soluble salt of silver in water containing a protective colloid.
3. An antiseptic preparation comprising a colloidal solution of a silver salt of sulfathiazole, and a protective colloid.
4. The method of preparing a colloidal silver salt of sulfathiazole which comprises reacting an alkali salt of sulfathiazole with a soluble salt of silver in water containing a protective colloid.
5. A composition essentially comprising a colloidal silver salt of sulfathiazole and a protective colloid.
6. A composition essentially comprising a colloidal silver salt of sulfapyridine and a protective colloid.
7. A composition essentially comprising a colloidal silver salt of sulfadiazine and a protective colloid.

WILLIAM A. LOTT.

REFERENCES CITED

The following references are of record in the file of this patent:

UNITED STATES PATENTS

| Number | Name | Date |
|---|---|---|
| 2,133,787 | Northey | Oct. 18, 1938 |
| 2,238,973 | Climento | Apr. 22, 1941 |
| 1,955,211 | Hoessle | Apr. 17, 1934 |
| 1,922,006 | Hoessle | Aug. 8, 1933 |

FOREIGN PATENTS

| Number | Country | Date |
|---|---|---|
| 849,504 | France | Aug. 21, 1939 |
| 19,168 | Great Britain | 1903 |
| 101,131 | Austria | Sept. 25, 1925 |
| 111,230 | Australia | Aug. 1940 |

OTHER REFERENCES

Journal American Chemical Society, Dec. 1941, p. 3523.

Industrial and Engineering Chemistry, analytical edition, pp. 346–347.

Journal American Chemical Society, Dec. 1939, p. 3593.

Journal American Medical Association, May 23, 1942, pp. 324–327.

Long and Bliss, Clinical and Exptl. Use of Sulfanilamide, Sulfapyridine and Allied Compounds, p. 18.

Journal of the American Pharmaceutical Association, March 1943, pp. 80–82.

New and Non-Official Remedies (1941), pp. 491–492.

Journal American Chemical Society, Aug. 1939, pp. 2032–2033.